A. R. McENTIRE.
SPRING WHEEL.
APPLICATION FILED FEB. 15, 1912.
1,030,314.
Patented June 25, 1912.
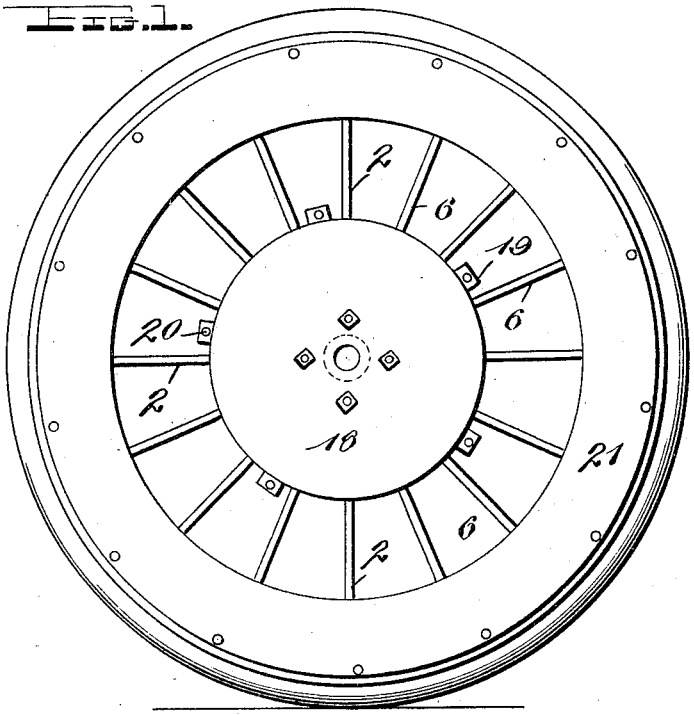
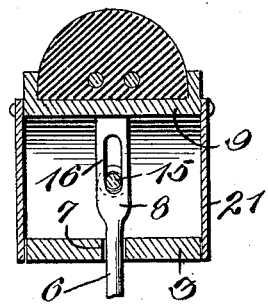
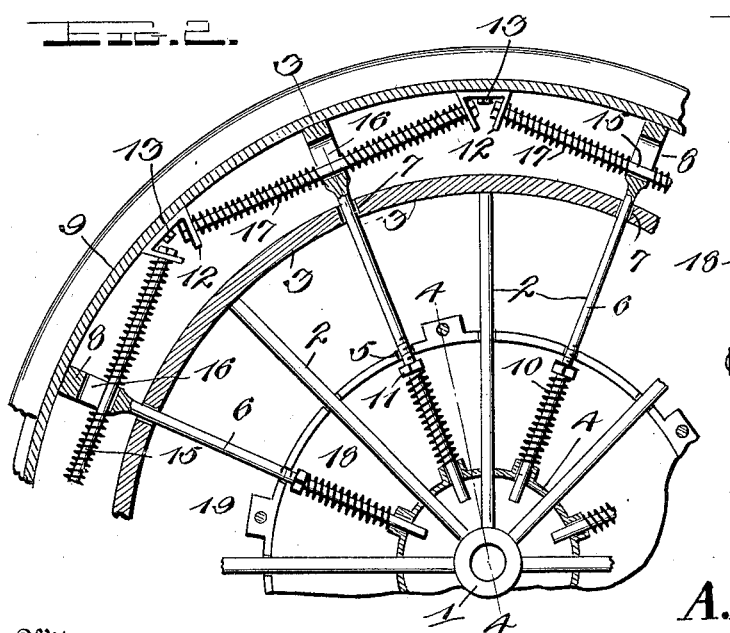
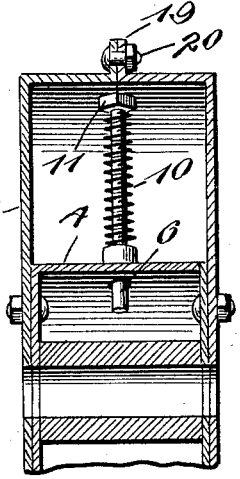
Witnesses
Chas. L. Griesbauer.
G. B. Norton.
Inventor
A. R. McEntire,
By Watson E. Coleman,
Attorney

UNITED STATES PATENT OFFICE.

ALVIN R. McENTIRE, OF FOLSOM, GEORGIA.

SPRING-WHEEL.

1,030,314. Specification of Letters Patent. Patented June 25, 1912.

Application filed February 15, 1912. Serial No. 677,681.

*To all whom it may concern:*

Be it known that I, ALVIN R. McENTIRE, a citizen of the United States, residing at Folsom, in the county of Bartow and State of Georgia, have invented certain new and useful Improvements in Spring-Wheels, of which the following is a specification, reference being had to the accompanying drawings.

This invention relates to new and useful improvements in vehicle wheels and has for its object the provision of a spring wheel, the construction of which is such as to positively prevent jolting or jarring of the felly and its associated parts incident to traveling over rough, uneven roads.

Another object of the invention is to provide a spring wheel which will possess advantages in points of efficiency and durability, is inexpensive of manufacture and at the same time is simple in construction and operation.

With the above and other objects in view, the invention consists in the novel features of construction and the combination and arrangements of parts hereinafter more fully described, pointed out in the claims and illustrated in the accompanying drawings, in which—

Figure 1 is a side elevation of a spring wheel constructed in accordance with my invention; Fig. 2 is an enlarged longitudinal sectional view of a fragment of the wheel; Fig. 3 is a sectional view on the line 3—3 of Fig. 2 and Fig. 4 is a sectional view on the line 4—4 of Fig. 2.

Referring more particularly to the drawings, I indicates the hub having a plurality of radially projecting spokes 2 which are secured at their outer ends by means of the felly 3. A hub casing 4 is secured to the hub and provided with a plurality of radial openings or sockets 5 adapted to receive the inner ends of the auxiliary spokes 6. The outer end of the auxiliary spokes are disposed through the spaced openings 7 in the felly, and the extreme outer ends of said auxiliary spokes are enlarged, as shown at 8, and adapted to support the outer rim 9. Slidably mounted on the auxiliary spokes 6 are the coil springs 10 which are arranged between the hub casing 4 and the adjusting nuts 11 which are threaded onto the spokes 6, the tension of said springs being adjusted by means of said nuts.

U-shaped brackets 12 are secured to the inner side of the rim 9 by means of the screw bolts 13, said brackets having their ends provided with openings adapted to receive the ends of the rods 15, said rods having their central portion mounted in the elongated openings 16 formed in the enlarged ends 8 of the auxiliary spokes 6. Coil springs 17 are mounted on the rods 15 and disposed between the ends 8 of the spokes 6 and the sides of the brackets 12.

A dust guard 18 is provided and adapted to inclose the hub casing 4 and the coil springs 10, said guard being formed of two mating sections provided with circumferentially disposed ears 19 through which are passed bolts 20 whereby the sections of the guard 18 are securely fastened together. The springs 17 are also inclosed by means of the dust guard 21 secured to the outer rim of the wheel.

It will be understood that either a steel or rubber tire may be secured to the rim 9, as desired.

From the foregoing description taken in connection with the accompanying drawings, the operation of my improved resilient wheel will be clearly understood. In the practical use of the device, any shock or stress which is imposed upon the tread surface of the tire at any point will be taken up and absorbed by the springs 10 and 17, and consequently the shock will not be transmitted to the hub and thence to the body portion of the vehicle, but will be practically dissipated.

While I have shown and described the preferred form of my invention it will be obvious that various changes in the details of construction and in the proportions may be resorted to for successfully carrying my invention into practice without sacrificing any of the novel features or departing from the scope thereof.

Having thus described the invention what is claimed is:—

1. In a vehicle wheel, the combination of a hub, a plurality of radial spokes projecting therefrom, a felly secured to the outer end of said spokes, a hub casing secured to said hub, having a plurality of radial openings formed therein, auxiliary spokes having their inner ends slidably mounted in said openings, an adjusting nut threaded on said auxiliary spokes, coil springs arranged between said hub casing and nuts, an enlarged end formed on the outer end of said auxiliary spokes, having elongated openings therein, an outer rim supported by the outer ends of said auxiliary spokes, brackets secured to the inner side of said rim, rods having their ends mounted in said brackets and disposed through the elongated openings in the ends of the auxiliary spokes, and coil springs mounted on said rods and arranged between the ends of the auxiliary spokes and said brackets.

2. In a vehicle wheel, the combination of a hub, a casing therefor, spokes having their inner ends slidably mounted in said casing, adjusting nuts threaded on said spokes, coil springs mounted on the spokes and arranged between said casing and adjusting nuts, a dust guard inclosing said casing and springs, enlarged ends formed on said spokes, having elongated openings formed therein, a rim supported by the outer ends of said spokes, brackets secured to the inner side of said rim, having openings formed therein, rods having their ends mounted in said openings and disposed through the elongated opening in the ends of the spokes, coil springs mounted on said rods and arranged between the ends of the spokes and said brackets, and a dust guard secured to the outer rim of the wheel and adapted to inclose said springs.

In testimony whereof I hereunto affix my signature in the presence of two witnesses.

ALVIN R. McENTIRE.

Witnesses:
C. J. BRADFRAD,
J. F. BAGWELL.

---

Copies of this patent may be obtained for five cents each, by addressing the "Commissioner of Patents, Washington, D. C."